United States Patent
Xu

(10) Patent No.: US 12,141,908 B2
(45) Date of Patent: Nov. 12, 2024

(54) IMAGE RENDERING METHOD AND APPARATUS, COMPUTER DEVICE, AND STORAGE MEDIUM

(71) Applicant: Tencent Technology (Shenzhen) Company Limited, Shenzhen (CN)

(72) Inventor: Liming Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 162 days.

(21) Appl. No.: 17/964,700

(22) Filed: Oct. 12, 2022

(65) Prior Publication Data
US 2023/0033306 A1  Feb. 2, 2023

Related U.S. Application Data

(63) Continuation of application No. PCT/CN2021/127918, filed on Nov. 1, 2021.

(30) Foreign Application Priority Data

Dec. 3, 2020 (CN) .......................... 202011395294.4

(51) Int. Cl.
*G06T 15/50* (2011.01)
*G06T 15/00* (2011.01)
*G06T 15/04* (2011.01)

(52) U.S. Cl.
CPC ............ *G06T 15/005* (2013.01); *G06T 15/04* (2013.01); *G06T 15/50* (2013.01); *G06T 2210/52* (2013.01)

(58) Field of Classification Search
CPC ....... G06T 15/005; G06T 15/80; G06T 15/50; G06T 17/00; G06T 15/04; G06T 11/001;
(Continued)

(56) References Cited

U.S. PATENT DOCUMENTS

2005/0259104 A1  11/2005 Koguchi
2011/0063285 A1  3/2011 Hoover et al.
(Continued)

FOREIGN PATENT DOCUMENTS

CN  106997610 A  8/2017
CN  107133909 A  9/2017
(Continued)

OTHER PUBLICATIONS

Tencent Technology, WO, PCT/CN2021/127918, Jan. 28, 2022, 5 pgs.
(Continued)

*Primary Examiner* — Hau H Nguyen
(74) *Attorney, Agent, or Firm* — Morgan, Lewis & Bockius LLP

(57) ABSTRACT

Provided is an image rendering method performed by a computer device, including: selecting, from a plurality of pre-compiled shaders associated with a rendering engine, a target shader corresponding to a graphic interface of an application program; acquiring scene data corresponding to a render target according to a rendering instruction triggered by the application program, and writing the scene data into a cache block; determining a plurality of render passes corresponding to the render target; merging, in the cache block, the plurality of render passes into a merged render pass based on the target shader; and performing image rendering on the scene data in the cache block in the merged render pass to obtain an image rendering result in the cache block.

20 Claims, 6 Drawing Sheets

(58) Field of Classification Search
CPC ......... G06T 2210/52; G06F 8/41; G06F 8/38; G09G 5/006
See application file for complete search history.

(56) References Cited

U.S. PATENT DOCUMENTS

| | | | |
|---|---|---|---|
| 2017/0358055 | A1 | 12/2017 | Swift et al. |
| 2019/0164337 | A1* | 5/2019 | Jin .......................... G06T 1/20 |
| 2020/0058263 | A1* | 2/2020 | McKeever ............ G06T 15/506 |
| 2020/0380757 | A1* | 12/2020 | Howson ................... G06T 1/20 |

FOREIGN PATENT DOCUMENTS

| | | |
|---|---|---|
| CN | 108765534 A | 11/2018 |
| CN | 108961382 A | 12/2018 |
| CN | 109389663 A | 2/2019 |
| CN | 111408138 A | 7/2020 |
| CN | 112381918 A | 2/2021 |

OTHER PUBLICATIONS

Tencent Technology, IPRP, PCT/CN2021/127918, May 30, 2023, 6 pgs.
Tencent Technology, ISR, PCT/CN2021/127918, Jan. 28, 2022, 2 pgs.
Michael Larabel, "Microsoft's New Open-Source Project is "Shader Conductor" for Cross-Compiling HLSL", Phoronix.com, Retrieved from the Internet on Jan. 17, 2024: https://www.phoronix.com/news/Microsoft-Shader-Conductor, Nov. 13, 2018, 2 pages.
Tencent Technology, Extended European Search Report, EP Patent Application No. 21899793.0, Feb. 15, 2024, 15 pgs.

* cited by examiner

IMAGE RENDERING METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2021/127918, entitled "IMAGE RENDERING METHOD AND APPARATUS, AND COMPUTER DEVICE AND STORAGE MEDIUM" filed on Nov. 1, 2021, which claims priority to Chinese Patent Application No. 202011395294.4, filed with the State Intellectual Property Office of the People's Republic of China on Dec. 3, 2020, and entitled "IMAGE RENDERING METHOD AND APPARATUS, COMPUTER DEVICE, AND STORAGE MEDIUM", all of which are incorporated herein by reference in their entirety.

FIELD OF THE TECHNOLOGY

This application relates to the field of image processing technologies, and in particular, to an image rendering method and apparatus, a computer device, and a storage medium.

BACKGROUND OF THE DISCLOSURE

Rendering is one of the important research topics in three-dimensional computer graphics. In the graphics processing pipeline, rendering is the last important step, through which a final display effect of a model and animation is obtained. With the increasing complexity of computer graphics, rendering is also increasingly becoming an important technology, which is widely used in computer and video games, simulation, special effects in film and television, visual design, and other scenarios. At present, different rendering tools have emerged, which can be used to be integrated into larger modeling or animation packages.

The current rendering is usually performed by using a fixed render pipeline through a specified graphic interface and shader. Usually, the process of calling the graphic interface for rendering requires a lot of resources and time, resulting in low efficiency of running on low-configured terminal devices.

SUMMARY

Based on this, to resolve the foregoing technical problems, it is necessary to provide an image rendering method and apparatus, a computer device, and a storage medium.

An image rendering method is performed by a computer device, the method including:
  selecting, from a plurality of pre-compiled shaders associated with a rendering engine, a target shader corresponding to a graphic interface of an application program;
  acquiring scene data corresponding to a render target according to a rendering instruction triggered by the application program, and writing the scene data into a cache block;
  determining a plurality of render passes corresponding to the render target;
  merging, in the cache block, the plurality of render passes into a merged render pass based on the target shader; and
  performing image rendering on the scene data in the cache block in the merged render pass to obtain an image rendering result in the cache block.

An image rendering apparatus is provided, applicable to a computer device, the apparatus including:
  a target shader calling module, configured to select, from a plurality of pre-compiled shaders associated with a rendering engine, a target shader corresponding to a graphic interface of an application program;
  a data acquiring module, configured to acquire scene data corresponding to a render target according to a rendering instruction triggered by the application program, and writing the scene data into a cache block; and
  a render processing module, configured to determine a plurality of render passes corresponding to the render target; merge, in the cache block, the plurality of render passes into a merged render pass based on the target shader; and perform image rendering on the scene data in the cache block in the merged render pass to obtain an image rendering result in the cache block.

A computer device is provided, including a memory and a processor, the memory storing a computer-readable instruction that, when executed by the processor, causes the computer device to implement the following steps:
  selecting, from a plurality of pre-compiled shaders associated with a rendering engine, a target shader corresponding to a graphic interface of an application program;
  acquiring scene data corresponding to a render target according to a rendering instruction triggered by the application program, and writing the scene data into a cache block;
  determining a plurality of render passes corresponding to the render target;
  merging, in the cache block, the plurality of render passes into a merged render pass based on the target shader; and
  performing image rendering on the scene data in the cache block in the merged render pass to obtain an image rendering result in the cache block.

One or more non-transitory computer-readable storage media are provided, storing a computer-readable instruction, the computer-readable instruction, when executed by a processor, implementing the following steps:
  selecting, from a plurality of pre-compiled shaders associated with a rendering engine, a target shader corresponding to a graphic interface of an application program;
  acquiring scene data corresponding to a render target according to a rendering instruction triggered by the application program, and writing the scene data into a cache block;
  determining a plurality of render passes corresponding to the render target;
  merging, in the cache block, the plurality of render passes into a merged render pass based on the target shader; and
  performing image rendering on the scene data in the cache block in the merged render pass to obtain an image rendering result in the cache block.

A computer program product is provided, including a computer-readable instruction, the computer-readable instruction being stored in a computer-readable storage medium. A processor of a computer device reads the computer-readable instruction from the computer-readable storage medium, and the processor executes the computer-readable instruction to implement the following steps:

selecting, from a plurality of pre-compiled shaders associated with a rendering engine, a target shader corresponding to a graphic interface of an application program;

acquiring scene data corresponding to a render target according to a rendering instruction triggered by the application program, and writing the scene data into a cache block;

determining a plurality of render passes corresponding to the render target;

merging, in the cache block, the plurality of render passes into a merged render pass based on the target shader; and performing image rendering on the scene data in the cache block in the merged render pass to obtain an image rendering result in the cache block.

Details of one or more embodiments of this application are provided in the accompanying drawings and descriptions below. Other features, objectives, and advantages of this application become apparent from the specification, the drawings, and the claims.

DESCRIPTION OF EMBODIMENTS

To make objectives, technical solutions, and advantages of this application clearer and more comprehensible, this application is further described in detail with reference to the accompanying drawings and embodiments. It is to be understood that the specific embodiments described herein are only used for explaining this application, and are not used for limiting this application.

Figure 1:
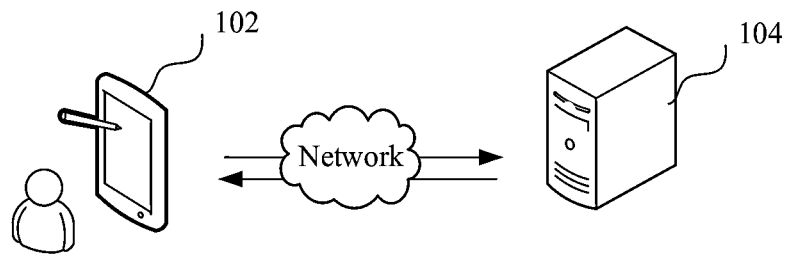
FIG. 1 is a diagram of an application environment of an image rendering method according to an embodiment.

The image rendering method provided in this application may be applied to an application environment shown in FIG. 1. A terminal 102 communicates with a server 104 through a network. After starting application program, the terminal 102 acquires scene data of an image to be rendered from the server 104 of the corresponding application program. The terminal 102 acquires a rendering instruction triggered by the application program; starts a rendering engine, the rendering engine including a plurality of pre-compiled shaders, the plurality of pre-compiled shaders being respectively generated by pre-compiling an generic shader of the rendering engine for different types of graphic interfaces; selects, from the plurality of pre-compiled shaders, a target shader corresponding to a graphic interface of the application program; acquires scene data corresponding to a render target according to the rendering instruction, and writes the scene data into a cache block; determines a render pass set corresponding to the render target, the render pass set including a plurality of render passes having a dependency relationship with each other; merges, in the cache block, the plurality of render passes having the dependency relationship into a same render pass based on the target shader; and performs image rendering on the scene data in the cache block in the same render pass.

The terminal 102 may be, but not limited to, a personal computer, a notebook computer, a smartphone, a tablet computer, and a portable wearable device. The server 104 may be implemented by an independent server or a server cluster including a plurality of servers. The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited in this application.

The cloud technology is a hosting technology that unifies a series of resources such as hardware, software, and networks in a wide area network or a local area network to implement computing, storage, processing, and sharing of data. The cloud technology is a collective name of a network technology, an information technology, an integration technology, a management platform technology, an application technology, and the like based on an application of a cloud computing business mode, and may form a resource pool, which is used as required, and is flexible and convenient. The cloud computing technology becomes an important support. A background service of a technical network system requires a large amount of computing and storage resources, such as video websites, image websites, and more portal websites. As the Internet industry is highly developed and applied, each article may have its own identifier in the future and needs to be transmitted to a background system for logical processing. Data at different levels is separately processed, and data in various industries requires strong system support, which can only be implemented through cloud computing.

Computer vision (CV) is a science that studies how to enable a machine to "see", and to be specific, to implement machine vision such as recognition, tracking, measurement, and the like for a target by using a camera and a computer in replacement of human eyes, and further perform graphic processing, so that the computer processes the target into an image more suitable for human eyes to observe, or more suitable to be transmitted to an instrument for detection. As a scientific discipline, the CV studies related theories and technologies and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, 3D object reconstruction, a 3D technology, virtual reality, augmented reality, synchronous positioning, and map construction, and further include biometric feature recognition technologies such as common face recognition and fingerprint recognition. It may be understood that the image rendering method of this application is based on CV technology to perform image rendering on an image to be rendered, which can effectively improve the efficiency of image rendering.

Figure 2:
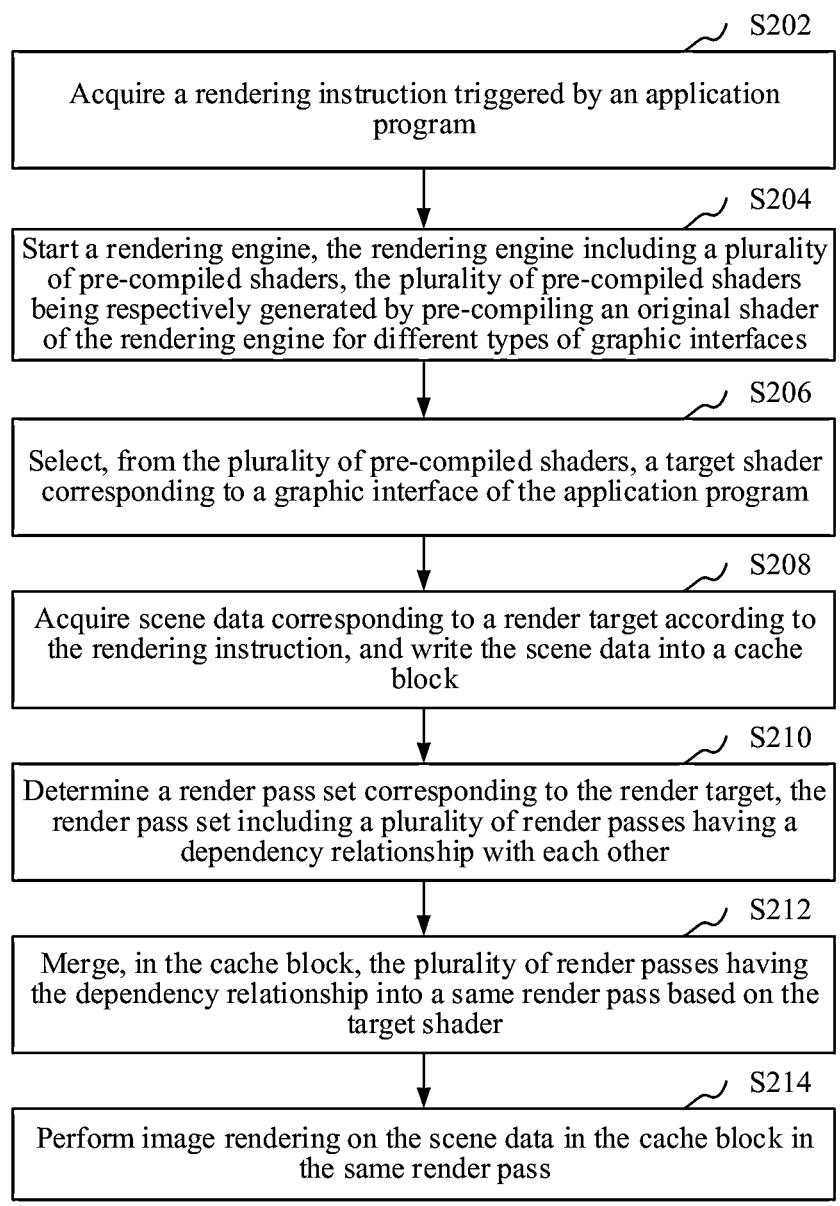
FIG. 2 is a schematic flowchart of an image rendering method according to an embodiment.

In an embodiment, as shown in FIG. 2, an image rendering method is provided. Using the method applied to the terminal in FIG. 1 as an example for description, the method includes the following steps:

S202. Acquire a rendering instruction triggered by an application program.

S204. Start a rendering engine, the rendering engine including a plurality of pre-compiled shaders, the plurality of pre-compiled shaders being respectively generated by pre-compiling an generic shader of the rendering engine for different types of graphic interfaces.

Image rendering in computer graphics refers to the process of two-dimensionally projecting an object model in a three-dimensional scene into a digital image according to the set environment, material, lighting, and rendering parameters, that is, the process of converting three-dimensional light energy transfer processing into a two-dimensional image. Scenes and entities are represented in three-dimensional form, closer to the real world and easier to manipulate and transform. In the graphic pipeline, rendering is the last important step, through which a final display effect of a model and animation is obtained.

The rendering engine is the core component or system that has been written to implement image rendering, such as the core component of some interactive real-time image application programs. The image rendering function required by the application program can be quickly established by using the rendering engine, to support the operation of the program.

It may be understood that the terminal includes a GPU, a memory, and a display screen. The memory includes a system memory corresponding to the system internal memory and a cache memory for high-speed data exchange. The cache memory includes cache blocks. An application program is deployed in the terminal, and a rendering engine is deployed in the application program. When running the rendering engine through the application program, the graphics processor the terminal can calculate all the effects of models, animations, light shadows, special effects, and the like in real time through the GPU, and display the rendering effect on the display screen of the terminal. For example, the rendering engine in the game application program includes Unreal Engine, Unity Engine, and the like.

The renderer or the shader in the application program is usually built based on the underlying graphic application programming interface (API), and the graphic interface is responsible for communicating with the hardware of the terminal to perform image rendering in a rasterized manner suitable for the hardware architecture. For example, commonly used graphic interfaces include Metal graphic interface, Vulkan graphic interface, open graphics library (OpenGL) graphic interface, OpenGL for embedded systems (OpenGLES) graphic interface, and the like. Metal is a low-level rendering application programming interface. Vulkan is a cross-platform 2D and 3D drawing application program interface. OpenGL is a cross-linguistic, cross-platform application programming interface for rendering 2D, 3D vector graphics. OpenGL ES is a subset of OpenGL 3D graphic interfaces designed for embedded devices such as mobile terminals, handheld devices, and handheld gaming consoles.

The shader is used to implement image rendering and is an editable program replacing a fixed rendering pipeline. The shader includes a vertex shader and a pixel shader. The vertex shader is mainly responsible for the calculation of the geometric relationship of the vertexes. The pixel shader is mainly responsible for the calculation of the source color. The shader replaces the conventional fixed rendering pipeline and enables related calculations in three-dimensional graphics calculations. Due to the editability, a wide variety of image effects can be achieved without being limited by the fixed rendering pipeline of the graphics card.

It may be understood that the shader is an algorithm that is inserted into the rendering pipeline and is responsible for combining the input vertex data in a specified manner with the input map or color, and then outputting it. Generally, the GPU reads the corresponding input texture through the shader and renders the input image frames inputted by the target shader through the rendering pipeline of the GPU. The rendered image frames are then written into the frame cache region for caching to be finally outputted to the screen of the terminal.

A rendering engine is deployed in the application program, and pre-compiled shaders corresponding to different types of graphic interfaces are deployed in the rendering engine. The shaders corresponding to different types of graphic interfaces are generated by compiling the generic shader of the rendering engine and may be run in the GPU of the terminal. It may be understood that the generic shader of the rendering engine refers to an open-source shader script in the rendering engine. The generic shader of the rendering engine usually support only the specified graphic interfaces and have different functional support for different types of graphic interfaces.

S206. Select, from the plurality of pre-compiled shaders, a target shader corresponding to a graphic interface of the application program.

By calling the graphic interface corresponding to the type of the current running platform of the application program, the target shader corresponding to the graphic interface can be acquired to adapt to the running platforms of different terminals. Therefore, the pre-compiled shader adapted to the graphic interface of the application program can be flexibly called.

After starting the application program, the terminal runs the application program and the rendering engine in the application program. In the process of running the application program, a series of rendering instructions may be transmitted to the terminal to perform image rendering on the image scene that the application program needs to display, to display the corresponding image effect on the interface of the terminal.

After the terminal acquires the rendering instruction triggered by the application program, the GPU of the terminal calls a target shader corresponding to a graphic interface of the application program from the pre-compiled shaders for different types of graphic interfaces in the rendering engine. The GPU of the terminal performs corresponding image rendering on the image frame to be rendered in the application program through the target shader called.

S208. Acquire scene data corresponding to a render target according to the rendering instruction, and write the scene data into a cache block.

In computer graphic processing, the render target is a buffer used to draw an image frame to be rendered in a computer internal memory, that is, a video memory buffer including the information required for drawing the image frame to be rendered. It may be understood that the render target is a buffer used to record the output result after pixel rendering. The render target corresponds to a contiguous memory region. There may be multiple memory regions at the same time, indicating that there are multiple render targets.

The graphic pipeline has a default render target referred to as a background buffer, which contains a part of a video memory of a next image frame to be drawn. Generally, most game application programs draw a large amount of content into other render targets outside a fallback buffer, then compile each image element, and combine each image element to form the final fallback buffer. It may be understood that in some scenarios, an image frame to be rendered may have multiple render targets. Different parts of an image frame to be rendered are drawn on different render targets, and then the render targets belonging to the image frame to be rendered are synthesized, to obtain the final image rendering result corresponding to the image frame to be rendered.

The scene data refers to various scene information corresponding to graphic objects in the image frame to be rendered, such as color, vertex data, texture data, material category, indirect lighting, normal vector, reflectivity, and normal line. The texture refers to a specific surface feature of an object, that is, the surface feature corresponding to the graphic object in the image frame to be rendered. Different object surfaces produce different texture images. For the render target, the terminal may acquire the scene data corresponding to the currently processed render target, such as all scene data corresponding to the image frame to be rendered, or some of the scene data corresponding to the image frame to be rendered.

The cache block is a cache resource subset allocated based on the cache memory. The resource subset is referred to as Tile Memory, that is, the cache block. Storing data to be processed in the cache memory can effectively improve data read-write performance and processing efficiency. The size of each cache block is determined by the GPU drive of the terminal. The GPU may determine what information is stored in each cache block through the rendering pipeline.

The GPU of the terminal divides the screen pixels when rendering. The calculated result data of each block of pixels is stored in a dedicated cache for graphics processing. After the whole chunk of pixels is calculated, the image rendering result is written to the external video memory. For example, the cache on the Apple-type GPU is referred to as Threadgroup Memory, the cache on the Mali-type GPU is referred to as Tile Buffer, and the cache on the Adreno-type GPU is referred to as Gmem memory, which can be collectively referred to as cache blocks.

It may be understood that the image frame to be rendered includes multiple graphic objects that need to be rendered. Graphic objects are graphic elements that need to be drawn, such as characters, vehicles, houses, and the like. Graphic objects may be generated by drawing according to the corresponding scene data. Generally, the scene data corresponding to the image frame to be rendered is stored in an installation package of the application program, the scene data corresponding to the image frame to be rendered may be retrieved from the installation package of the application program, and the retrieved scene data is subjected to image rendering.

In the process of rendering the image, after acquiring the scene data corresponding to the render target according to the rendering instruction, the terminal first writes the acquired scene data into the cache block to directly perform image rendering on the corresponding render target according to the scene data in the cache through the target shader.

S210. Determine a render pass set corresponding to the render target, the render pass set including a plurality of render passes having a dependency relationship with each other.

S212. Merge, in the cache block, the plurality of render passes having the dependency relationship into a same render pass based on the target shader.

It may be understood that the generic shader is recompiled based on the rendering engine to respectively obtain the shaders corresponding to different types of graphic interfaces. The pre-compiled shader corresponding to each type of graphic interface can implement the optimized processing of deferred rendering pipelines based on cache blocks. That is, it can be supported that the intermediate result data obtained from the render passes having a dependency relationship for the render target is first written into the cache block for deferred rendering in the cache library, and finally the image rendering result obtained in the cache block is written into the system internal memory.

The dependency relationship refers to a relationship where a change in one activity affects another activity. It may be understood that the render passes having the dependency relationship mean that multiple render passes include a data-dependent render pass. That is, the data of one render pass affects the processing of the other render pass. For example, the processing of one render pass depends on the data corresponding to the other render pass, which means that the two render passes have a dependency relationship. "Multiple" means two or more than two.

The RenderPass refers to a rendering process for an object to be rendered, that is, a set of rendering instructions that the application program submits to the GPU once. It may also be understood that a render pass is a single run of a rendering pipeline. Each render pass renders some graphic objects, and then these render passes form a rendering pipeline. For example, the render pass may include the GBuffer Pass, the Shading Pass, and the like. The GBuffer Pass, in deferring rendering pipelines, is a step of outputting attributes of all visible objects into multiple textures for later lighting calculation. GBuffer refers to a geometric buffer including position information, lighting information, normal information, material category, tangent information, texture information, etc. The result outputted from GBuffer Pass is the intermediate result. For example, it usually requires four textures to store. Shading Pass is a process of further lighting and shading based on the intermediate result outputted from GBuffer Pass. It may be understood that the intermediate result represents the data outputted from each render pass during image rendering. Based on the intermediate result, image rendering can be further performed to obtain the final image rendering result.

It may be understood that a rendering pipeline is a parallel processing unit that independently processes graphic signals inside the display chip. A rendering pipeline is a set of dedicated passes in the display core that are responsible for coloring the graphics. The quantity of rendering pipelines is generally expressed as the number of pixel rendering pipelines multiplied by the number of texture units per pipeline. A rendering pipeline usually includes an application phase, a geometry phase, and a raster phase. The main function of a graphical rendering pipeline is to generate a rendered 2D image based on a given virtual camera, 3D object, light source, and the like.

In multi-pass rendering techniques, an object usually requires multiple rendering operations, and the result of each rendering process is added to the final presenting result. A render pass renders the intermediate result data of an image frame into a cache block of a cache internal memory. The render passes for the same render target are interdependent, and later render passes use the data of the previous render passes, such as depth information and geometry information. The result data obtained from the last render pass is the final image rendering result. Therefore, the render pass may be understood as an image rendering process.

Specifically, image rendering may be performed by deferred rendering, that is, by using deferred rendering pipelines. Deferred rendering is first rendering a scene that does not accept lighting to a geometric buffer, then rendering the scene data into the texture corresponding to the graphic object in the image frame to be rendered by the geometric buffer, and then lighting the data rendered into the texture. It may be understood that the geometric buffer is used to render the scene data into the texture corresponding to the graphic object in the image frame to be rendered. By deferred rendering, the lighting calculation of invisible pixel points can be avoided, allowing the control of the shading range of the light source through the light source geometry, which can render a large number of light sources, and can effectively improve the rendering efficiency of multi-source scenes. For scenes with a large number of light sources and objects, deferred rendering is much more efficient than forward rendering, and deferred rendering can greatly reduce the computational pressure of the pixel shader.

It may be understood that each render pass includes a corresponding drawing command, such as a drawing command for each graphic object. Merging the render passes into the same render pass is to combine the drawing commands of multiple render passes into a drawing command of an overall render pass. The merged render passes may be used as sub-render passes in the overall render pass.

After the terminal acquires the scene data, the GPU utilizes the target shader to process each render pass corresponding to the render target according to the scene data. In the process of image rendering, the target shader combines the drawing commands of the render passes corresponding to the render target and having a dependency relationship with each other in the cache block into a drawing command of one overall render pass, so as to merge the render passes having the dependency relationship with each other into the same render pass, so that the drawing command corresponding to the original render pass can be executed in the same merged render pass, and thus the intermediate result obtained after processing each drawing command in the same render pass is written into the cache block. It may be understood that the drawing commands of multiple render passes are combined into a drawing command of one overall render pass, so that the drawing commands in the merged render pass are all processed in the same way of data reading and writing. That is, the data required for each drawing command is read from the cache block, and the intermediate result outputted after each drawing command is executed is also written into the cache block. This enables the calculation of the merged render pass to be processed in the cache block, thereby ensuring that the intermediate result data obtained from the merged render pass is not written into the system internal memory.

S214. Perform image rendering on the scene data in the cache block in the same render pass.

It may be understood that the image rendering result is the final result obtained after a series of render pass processing is completed for the render target.

It may be understood that the cache first exchanges data with the processor in the system internal memory, so the data is extracted directly from the cache and then processed, and the reading rate and processing rate of the data is high.

The GPU of the terminal, through the target shader, merges the render passes corresponding to the render target and having a dependency relationship with each other in the cache block, then performs image rendering on the scene data in the cache block in the same merged render pass, and writes the finally obtained image rendering result into the cache block to obtain the image rendering result in the cache block. This can effectively implement the calculation of the merged render pass to be processed in the cache block, so as to obtain the image rendering result in the cache block.

In an embodiment, the GPU of the terminal further writes the final image rendering result obtained in the cache block into the system internal memory. Specifically, the image rendering result may be written into a frame cache in the system internal memory such that the display screen of the terminal reads the image rendering result from the frame cache to display the image rendering result on the display screen of the terminal.

In the conventional way, when processing each render pass, the intermediate result data obtained from each render pass needs to be written back into the system internal memory. When the next render pass is processed, the corresponding intermediate result data is read from the system internal memory for image rendering. In the process of processing each render pass in this way, a large amount of read and write data is required for calculation, which causes great pressure on the bandwidth. Moreover, the GPU and the CPU of the existing mobile terminal usually share the same physical memory architecture, which increases the pressure of the GPU and causes wasted hardware resources.

In the image rendering method above, after acquiring the rendering instruction triggered by the application program, the terminal calls a target shader corresponding to a graphic interface of the application program from pre-compiled shaders for different types of graphic interfaces in the rendering engine. The pre-compiled shader is generated by compiling the generic shader of the rendering engine. Therefore, when the application program is running, the shader corresponding to the graphic interface can be flexibly called according to a type of a current running platform of the application program, so as to be able to adapt to various running platforms. The terminal then acquires scene data of a render target according to the rendering instruction, and writes the scene data into a cache block. Through the target shader, the render passes corresponding to the render target and having a dependency relationship with each other are merged into the same render pass for image rendering according to the scene data in the cache block, and then the image rendering result obtained in the cache block is written into the system internal memory. This avoids a large amount of data read and write consumption caused by writing the intermediate result data obtained from each render pass into the system internal memory, thereby effectively reducing the bandwidth consumption during image rendering, and then effectively improving the efficiency of image rendering.

In an embodiment, the method further includes: configuring, in the generic shader of the rendering engine, an explicit description function and a marking function respectively corresponding to each type of graphic interface for compiling to obtain a shader corresponding to each graphic interface. The explicit description function is used for adding description information of each of the render passes; and the marking function is used for marking a begin render identifier and an end render identifier of the merged render pass.

The pre-compiled shader is generated by compiling the generic shader of the rendering engine. Therefore, before calling the target shader corresponding to the graphic interface of the application program, it is also necessary to pre-compile the shaders corresponding to different types of graphic interfaces respectively.

Through the corresponding compilation side, the developers may compile the rendering engine or may directly acquire the pre-compiled rendering engine to be deployed in the application program in the process of compiling the application program. Then the shaders corresponding to different types of graphic interfaces are compiled based on the generic shader already in the rendering engine.

Specifically, in the process of compiling the shader corresponding to each graphic interface based on the generic shader, the explicit description function and the marking function corresponding to each type of graphic interface are respectively configured to generate the shader corresponding to each graphic interface. For example, the generic shader in the rendering engine may be compiled when the rendering engine packs the items, to respectively generate the shader corresponding to each type of graphic interface.

For the explicit description function, a corresponding explicit description function may be configured in the shader to add description information of each render pass and input-output parameter information of each render pass through the explicit description function, to determine which render targets need to be read and written to establish a dependency relationship between the render passes.

For the marking function, a marking function may be configured in the shader to mark the begin render identifier such as BeginRenderPass prior to the first render pass according to the rendering sequence of each render pass. The end render identifier such as EndRenderPass is also marked after the last render pass. This ensures that the intermediate data obtained from each render pass is not written into the system internal memory.

In this embodiment, the compiled shaders corresponding to various types of graphic interfaces support image rendering based on cache blocks. For mainstream graphic interfaces corresponding to the mobile terminal platform, such as the graphic interface of Metal type, the graphic interface of OpenGLES type, and the graphic interface of Vulkan type, the support for the use of cache blocks is provided. For example, the graphic interface of Metal type can support the input attributes of a fragment function, such as Fragment Function Input Attribute. The OpenGLES-type graphic interface can support frame buffer reading attributes, such as FramebufferFetch, and pixel local storage attributes, such as PixelLocalStorage. These features provide varying degrees of support for cache blocks.

Figure 3:
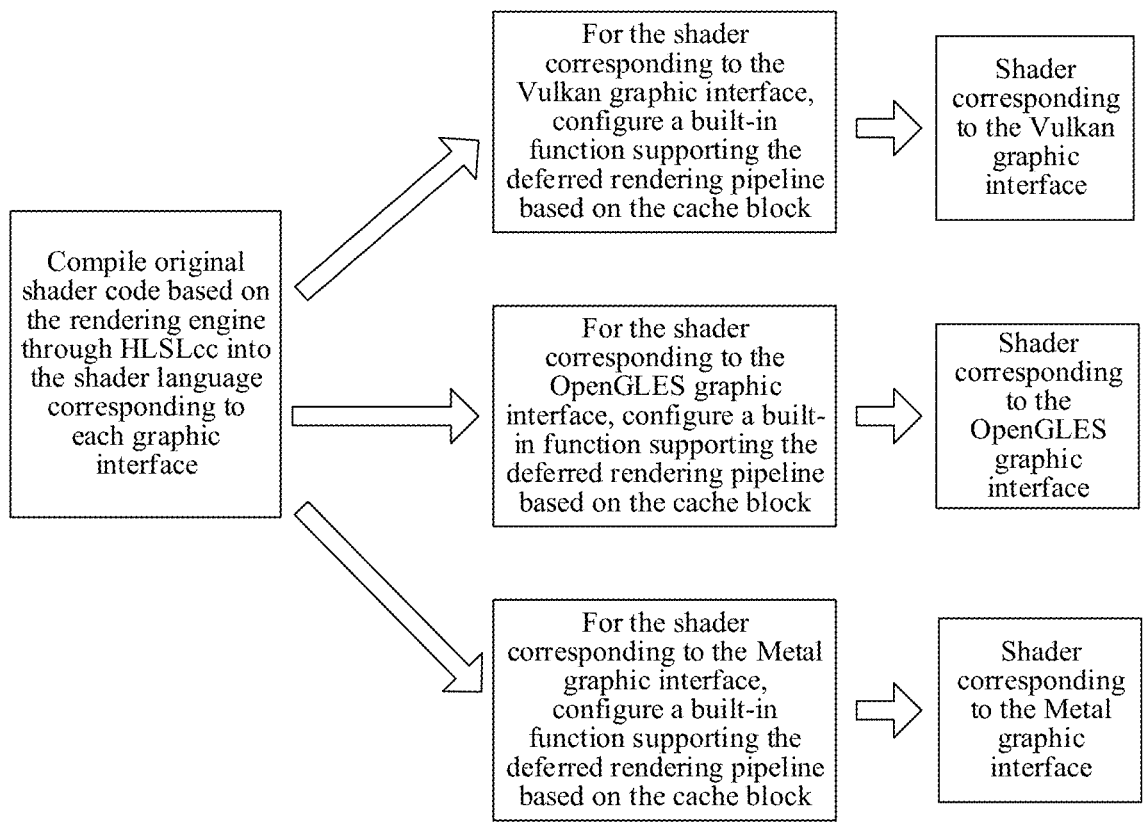
FIG. 3 is a schematic diagram of compiling a shader corresponding to each graphic interface type according to an embodiment.

Using the graphic interfaces of Metal type, OpenGLES type, and Vulkan type as an example, FIG. 3 is a schematic diagram of compiling a shader corresponding to each graphic interface type according to an embodiment. Specifically, in the process of compiling the shader at a compilation side, in the high level shader language (HLSL)-based shader, the generic shader of the rendering engine may be compiled through the HLSL cross compiler (HLSLcc) to obtain the shader language corresponding to each graphic interface. Then, in the process of translating the generic shader into the target platform shader language, compatible shader code is generated for different shader languages and different running platform types. In the process of compilation, the built-in functions supporting the deferred rendering pipeline based on the cache block are respectively configured in the shaders of each graphic interface to represent the read on the cache block. The compiled shaders corresponding to each type of graphic interface can realize the optimized processing of the deferred rendering pipeline based on the cache block. Therefore, the shader corresponding to each graphic interface type can be obtained.

Further, in the rendering pipeline, differences in various types of running platforms may lead to different execution paths on some platforms. Therefore, the execution paths corresponding to various types of running platforms may also be configured. In the rendering pipeline, it is necessary to detect the support of the current running platform and execute the corresponding execution path configured.

For the Vulkan-type graphic interface, it is only necessary to correspondingly configure the explicit description function of the render pass to the structure required by the Vulkan-type graphic interface, and to configure the read and write operations for each render pass to be consistent.

For the OpenGLES-type graphic interface and the Metal-type graphic interface, the operation of merging the render passes is implicit relative to the Vulkan-type graphic interface. The term "implicit" means that the interface and class are accessible. Therefore, the GPU, when running the rendering engine, can directly call the explicit description function and the marking function that are pre-configured for the graphic interface. As long as the target shader called by the rendering layer does not finish before the rendering end identifier, it ensures that the render passes having a dependency relationship are merged.

In an embodiment, for the graphic interface of the OpenGLES type and the graphic interface of the Metal type, correlation attributes may be further configured to each render pass to set incoherent attribute information for the frame buffer region corresponding to the render pass without a dependency relationship. In the process of performing image rendering, the target shader may acquire attribute information in the correlation attributes based on the dependency relationship between the render passes to identify the render passes with incoherent attributes. For example, on the Qualcomm platform, the correlation attributes of each render pass may be configured by using the FramebufferFetchNonCoherent function. For incoherent render passes corresponding to the same pixel on the cache block, the GPU uses different threads for image rendering. This can reduce synchronization between different threads of the same pixel on the cache block to increase rendering performance.

Figure 4:
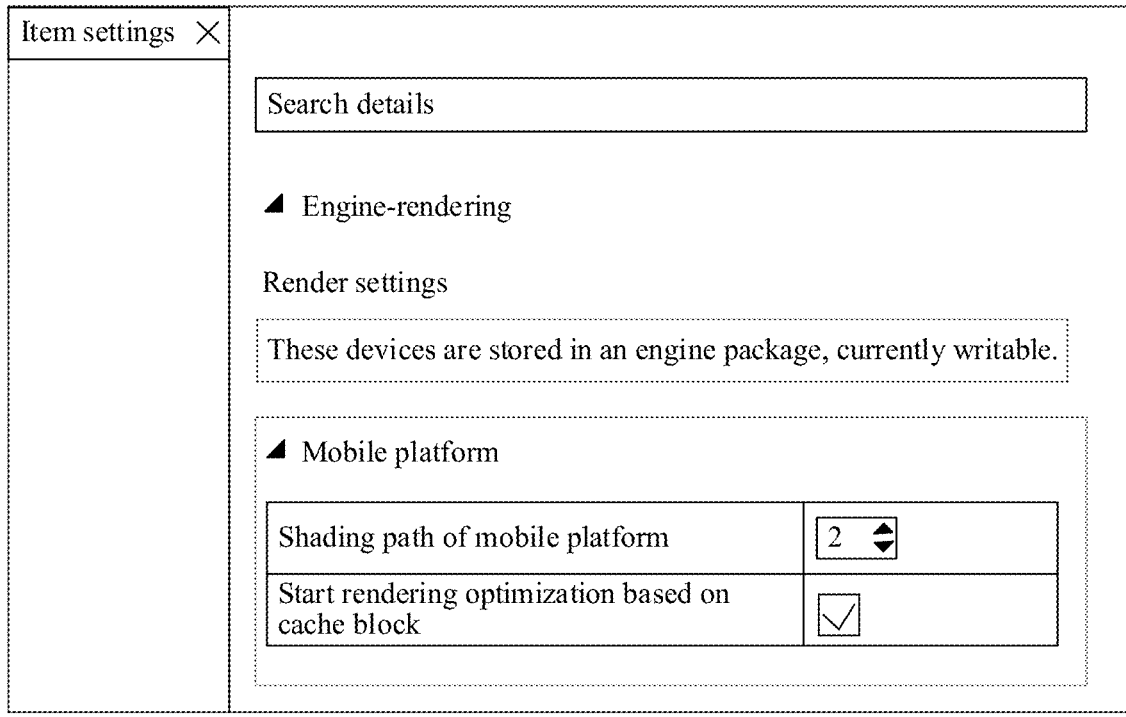
FIG. 4 is a schematic diagram of an item setting interface of a rendering engine editor according to an embodiment.

In an embodiment, in the process of configuring the rendering engine, the selection of rendering pipelines for the mobile terminal platform and the switch whether to enable the optimization based on Tile Memory may be added in the item setting interface of the rendering engine editor. For example, FIG. 4 shows an item setting interface of a rendering engine editor. The item setting interface includes an option of a shading path of a mobile platform and an option of starting rendering optimization based on a cache block. When the option of a shading path of a mobile platform is set to 2, it indicates that the deferred rendering pipeline is enabled. When the option of starting rendering optimization based on a cache block is selected, it indicates that the bandwidth optimization based on the cache block is enabled. After the deferred rendering pipeline and the bandwidth optimization based on the cache block are enabled, the deferred rendering pipeline can be used on mobile devices with lower power consumption to support a large number of light sources.

In an embodiment, the configuring, in the generic shader of the rendering engine, an explicit description function and a marking function respectively corresponding to each type of graphic interface for compiling to obtain a shader corresponding to each graphic interface includes: configuring, in the generic shader of the rendering engine, explicit description functions and marking functions corresponding to different types of GPUs respectively for each type of graphic interface for compiling to obtain the shader corresponding to each type of graphic interface.

Different types of GPUs have different supports for extensions of different types of graphic interfaces. Therefore, for different types of GPUs, the corresponding explicit description functions and marking functions need to be configured by using proper extensions respectively, to optimize the configuration of the shaders corresponding to various types of graphic interfaces. That is, in the shader corresponding to each type of graphic interface, a plurality of explicit description functions and marking functions corresponding to different types of GPUs are further configured respectively.

For example, for the shader corresponding to the OpenGLES-type graphic interface and the Mali-type GPU, an extension based on pixel local storage is used to optimize the configuration based on the cache block. For example, an extension based on pixel local storage may use the EXT_shader_pixel_local_storage extension. For GPUs other than the Mali type, an extension based on frame buffer reading may be used to optimize the configuration based on the cache block. For example, an extension based on frame buffer reading may use the EXT_shader_framebuffer_fetch extension.

For the extension based on pixel local storage, such as Pixel Local Storage, a multiple render target (MRT) is not supported by the extension based on pixel local storage in the generic shader. Therefore, the explicit description function may be flexibly configured in the shaders corresponding to various types of graphic interfaces. Once it is detected during running that the explicit description function is set in the shader, all render targets other than the current render target are removed when each render pass is constructed, for example, by setting render pass hint information Subpass Hint.

In addition, the extension based on pixel local storage does not support fixed function blending. Consequently, the method of blending with the corresponding hardware unit in the GPU is used, that is, the method of combining the extension with the hardware unit in the GPU is used. Therefore, the GPU may perform resource consumption, allocation, and calling on the rendering pipeline (that is, the hardware unit) in the GPU through the compilable shader and other software programs. By using the extension based on pixel local storage the rendering pipeline can be adjusted during rendering by programmable blending (that is, function merging) for all render passes.

Because the extension based on pixel local storage requires the shader to declare a structure, the member variables in the structure represent the variables to be stored in the cache block. Therefore, the read on the cache block is represented by utilizing a custom built-in function in the shader, such as "FramebufferFetchMRT0( )-FramebufferFetchMRT7( )". For example, the sequence numbers 0-7 represent the read on the render targets 0-7. During processing, if the use of the above function is detected, a declaration of the structure based on pixel local storage is added into the shader. The structure contains all the variables stored in the cache block. The reference to the built-in function above is then converted to the read on the members of the structure based on pixel local storage extension. Instead of adding additional built-in functions to write to each member of the shader, a method of directly performing text replacement in the shader is provided. This does not add too much complexity to the shader, such as too much branching for different types of running platforms.

Each shader that uses the extension based on pixel local storage has to declare a structure that contains all of the member variables to be stored in the cache block. Each shader may call different functions during running, leaving each shader unaware of the exact members of the complete structure based on pixel local storage extension during processing. Therefore, a built-in function, that is, an explicit description function such as "CTGNumberOfColorsToKeepInTileMem ( )", is defined in the shader to notify the shader how many render targets in total are stored in the cache block as the structure variables.

Simultaneous writing of structure members and render targets is not supported by some extensions based on pixel local storage. Therefore, it is necessary to specify that the shaders in the current render pass are the last ones that use the extension based on pixel local storage. Configuring another built-in function, that is, a marking function such as "CTGPLSColorResolvePass( )", in the shader to indicate that the current render pass is the last render pass. Therefore, the intermediate result of each render pass is to be written into the cache block corresponding to the render target instead of continuing to be written to the structure based on pixel local storage. As a result, adjacent render passes using the structure based on pixel local storage may be merged into one render pass by using the extension based on pixel local storage.

The configuration process for the shader corresponding to the graphic interface of the Vulkan type is similar to the process described above. For example, on the running platforms other than the Mali type, such as Adreno and PowerVR, the extension based on frame buffer reading is used to optimize configuration, such as the extension EXT_shader_framebuffer_fetch. Similar to the configuration described above, the read on the cache block is represented by configuring the built-in function to the shader. In the shader corresponding to the OpenGLES type of graphic interface, these functions are resolved to the shader syntax supported by the extension based on frame buffer reading, including declaring each render target to be read in the shader as an input attribute and replacing the built-in function with a direct reference to the attribute of the render target.

For the shader corresponding to the Metal type of the graphic interface, the explicit description function and the marking function are configured in a manner similar to the configuration manner described above for the extension based on frame buffer reading. The returned value of the shader may also be replaced by customizing the built-in function. The difference is that the returned value is replaced with the syntax rules required by the Metal type of the graphic interface, that is, to add the render target to be read as an input parameter in the parameter list of the entrance function of the shader, and to set a correct Raster Order Group sequence to acquire correct and high-performance read-write synchronization.

In this embodiment, the implementation of different paths is selected by detecting the current extension support in the shader, which supports the use of the same shader for different types of running platforms to avoid the possible performance loss caused by compiling multiple shaders.

In an embodiment, a render hardware interface (RHI) layer of the rendering engine includes different types of graphic interfaces; and the method further includes: determining, according to a running platform type of the application program, from the different types of graphic interfaces, a type of graphic interface corresponding to the running platform type in the application program.

The rendering engine includes a render hardware interface (RHI) layer, which is a unified interface. The RHI layer in the rendering engine corresponds to a plurality of graphic interfaces. Calling the RHI in the rendering engine is to determine the shader corresponding to the graphic interface currently in use and the corresponding implementation when the rendering engine is initialized, to ensure that the rendering engine runs under different types of running platforms with the same result.

It may be understood that a rendering layer is also included in a GPU. The rendering layer of the GPU processes the corresponding rendering task by calling the interface of the RHI layer of the rendering engine. Different types of running platforms have different implementations for the graphic interface of the RHI layer. Therefore, when the engine packs items, the implementations of the shaders corresponding to multiple types of graphic interfaces may be selected to be packed to the rendering engine. When the application program starts initialization, the type of the current running platform is detected to call the shader corresponding to the proper graphic interface for image rendering. For example, for the Windows-type running platform, the shader corresponding to the graphic interface of the DirectX type may be selected; and for the Android-type running platform, the shader corresponding to the graphic interface of the Vulkan type may be selected.

After the rendering engine starts running, each graphic interface in the RHI layer of the Unreal Engine is provided to the rendering layer to adapt to different types of running platforms.

In this embodiment, the type of the current running platform of the application program is detected by starting initialization of the program through the terminal. When the application program starts running, the rendering engine in the application program runs simultaneously. The GPU of the terminal determines the graphic interface of the type corresponding to the type of the running platform in the application program from different types of graphic interfaces according to the type of the running platform of the application program, so as to call the shader adapted to the type of the current running platform to efficiently perform image rendering.

In an embodiment, the target shader includes explicit description functions and marking functions corresponding to different types of GPUs; and the merging, in the cache block, the plurality of render passes having the dependency relationship into a same render pass based on the target shader includes: calling, through a GPU, an explicit description function and a marking function corresponding to a type of the GPU from the target shader; and merging, through the target shader, the plurality of render passes having the dependency relationship into the same render pass in the cache block according to the called explicit description function and marking function.

The GPU includes various types, such as Mali type, Apple type, and Adreno type. For different types of GPUs, explicit description functions and marking functions adapted to various types of GPUs may be respectively configured in shaders corresponding to graphic interfaces.

When running the application program, the terminal detects the functions configured in the called target shader for various types of GPUs. The terminal then calls the explicit description function and the marking function corresponding to the type of the GPU from the target shader through the GPU.

The terminal, through the target shader, merges the render passes corresponding to the render target and having a dependency relationship with each other into the same render pass according to the called explicit description function and marking function to perform image rendering on the merged render pass in the cache block.

In this embodiment, by configuring explicit description functions and marking functions adapted to various types of GPUs respectively in the shaders corresponding to the graphic interfaces, the performance loss that may result from compiling multiple shaders for different types of GPUs is avoided, and resource consumption is effectively reduced.

In an embodiment, the merging, through the target shader, the plurality of render passes having the dependency relationship into the same render pass in the cache block according to the explicit description function and the marking function includes: acquiring, through the target shader, description information corresponding to each of the render passes according to the explicit description function; determining a render target corresponding to each of the render passes and the dependency relationship between the render passes according to the description information corresponding to each of the render passes; and merging, in the cache block, the render passes having the dependency relationship into the same render pass corresponding to the render target according to the marking function.

The description information refers to the information used to describe the attributes of each render pass, such as input parameters and output parameters of each render pass. Through the description information, various attribute information such as the input parameters and output parameters of each render pass may be explicitly acquired, so that the bandwidth corresponding to which render target is saved can be clearly known.

In the process of performing image rendering through the shader, the GPU of the terminal may acquire the description information corresponding to each render pass through the explicit description function in the shader. Since the description information includes various attribute parameters such as the input parameters and output parameters of each render pass, the render target corresponding to each render pass and the dependency relationship between the render passes can be determined based on the description information.

The render pass may be regarded as a process of rendering a geometry onto a texture or screen at once. There may be any quantity of geometric objects, that is, graphic objects, being rendered in a render pass. Usually, some rendering effects require a plurality of render passes to be achieved. For example, a house is first rendered to a texture map, the texture map is blurred with a render pass, and then the result is outputted to another texture, to obtain a blurred house scene. This is often not efficiently achieved in a render pass. The quantity of the render passes in each image frame may be determined through the rendering engine. Each render pass renders some graphic objects, and then these render passes form a rendering pipeline. Therefore, the rendering engine can determine how many render passes are included in the rendering pipeline, and the rendering pipeline determines a final rendering effect of the rendering engine.

Figure 5:
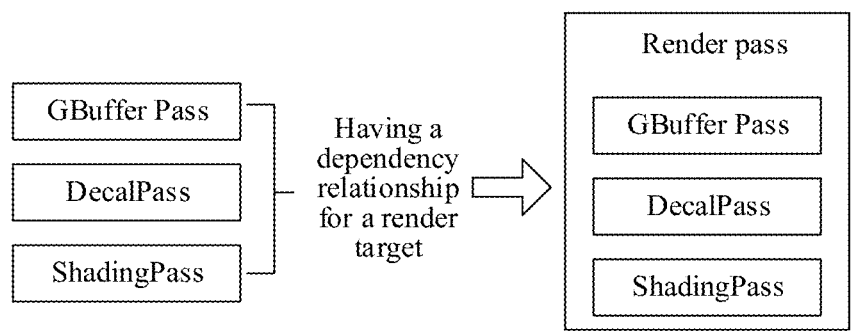
FIG. 5 is a schematic diagram of merging render passes according to an embodiment.

Each render pass may also include sub-render passes. For example, each RenderPass may include a plurality of Subpasses. These render passes or sub-render passes may be merged under certain conditions. FIG. 5 is a schematic diagram of merging render passes according to an embodiment. For example, a render pass includes GBuffer Pass, DecalPass, and ShadingPass, and all the three render passes can be regarded as Subpasses. Adding the corresponding description information to the render passes through the target shader may determine that the three render passes are render passes having a dependency relationship for the render target. The three Subpasses are merged into one RenderPass, so that the read and write of the intermediate result data obtained from the merged render pass is performed in the cache block. This effectively saves the bandwidth in image rendering.

Specifically, the GPU merges render passes corresponding to the same render target and having a dependency relationship with each other into the same render pass corresponding to the render target in the cache block according to the marking function. The GPU of the terminal performs image rendering on the merged render pass through the target shader according to the scene data in the cache block.

In this embodiment, in the process of performing image rendering, the render passes corresponding to the same render target and having a dependency relationship with each other can be effectively merged into the same render pass in the cache block by calling the pre-compiled explicit description function and the marking function through the target shader. Therefore, the intermediate data of the merged render pass can be stored in the cache block and not be written into the system, which effectively saves bandwidth.

In an embodiment, scene data corresponding to each pixel is stored in a cache block; and the performing image rendering on the scene data in the cache block in the same render pass includes: calling a thread corresponding to each pixel and executing each called thread in parallel, to perform image rendering on the merged render pass through the target shader and the scene data.

A pixel refers to a smallest unit in an image represented by a numeric sequence. A pixel is a small block that forms an image. Each small block has a clear position and an assigned color value. The colors and positions of the small blocks determine the appearance of the image.

It may be understood that a pixel is a smallest unit in an image frame to be rendered. The image frame to be rendered includes one or more graphic objects. A graphic object may include one or more pixels.

In the process of image rendering, the GPU may use multi-thread synchronization processing. By pre-compiling shaders corresponding to various types of graphic interfaces, the shaders corresponding to various types of graphic interfaces can architecturally support multi-thread rendering. Specifically, through the configured explicit description function, the description information of each render pass is explicitly displayed, the dependency relationship among the render passes is then determined according to the description information, and then the parallelism is increased based on the dependency relationship, to ensure the correct thread synchronization. For example, a corresponding object that needs synchronized thread processing may be determined by adding the corresponding sequence attribute information to the input and output parameters for each render pass.

For example, for the shader corresponding to the OpenGLES type of graphic interface, through the configured explicit description function, the description information of each render pass is explicitly displayed, the dependency relationship among the render passes is then determined according to the description information, and then the parallelism is increased based on the dependency relationship, to ensure the correct thread synchronization. For the extension based on pixel local storage and the extension based on frame buffer reading, the shader corresponding to the OpenGLES graphic interface determines the corresponding object that needs synchronized thread processing through the dependency relationship set among the render passes.

For the shader corresponding to the Vulkan type of graphic interface, thread synchronization among the render passes may also be ensured by setting the dependency relationship among the render passes. For example, synchronization between the Drawcall drawing commands inside the same Subpass is controlled by PipelineBarrier.

For the shader corresponding to the Metal type of graphic interface, thread synchronization among the render passes may be ensured by setting different raster group order attributes, that is, Raster Order Group, for different output variables in the shader.

In the process of performing image rendering through the shader, the GPU of the terminal calls a thread corresponding to each pixel and executes each called thread in parallel, to perform image rendering on the merged render pass through the target shader and the scene data. Specifically, each thread of the GPU corresponds to a pixel for calculation, and the intermediate result data is respectively stored in the cache block corresponding to each pixel. Threads of different pixels on a cache block are executed in parallel. Read-write synchronization is maintained for different threads of the same pixel.

In this embodiment, the thread corresponding to each pixel is called respectively through the GPU, and the threads called are executed in parallel, so that the thread synchronization rendering can be effectively implemented, and the rendering efficiency can be effectively improved.

In an embodiment, the performing image rendering on the scene data in the cache block in the same render pass includes: marking, for the render passes having the dependency relationship, a begin render identifier and an end render identifier corresponding to each of the render passes; performing, through the target shader, image rendering on the merged render pass according to the scene data in the cache block, to obtain an intermediate result corresponding to each of the render passes between the begin render identifier and the end render identifier; and writing the intermediate result corresponding to each of the render passes between the begin render identifier and the end render identifier into the cache block to obtain the final image rendering result in the cache block.

The target shader includes a pre-configured marking function for marking the begin render identifier and the end render identifier of the render pass for each render target. Therefore, when calling the target shader to process each render pass, the GPU may identify the begin render identifier and the end render identifier of the render pass for the current render target through the marking function configured in the target shader.

Specifically, the GPU determines the render passes having a dependency relationship according to the description information of each render pass through the target shader. The begin render identifier and the end render identifier in these render passes are then marked for the render passes corresponding to the render target and having a dependency relationship with each other. The GPU then performs image rendering on the merged render pass through the target shader according to the scene data in the cache block to obtain the intermediate result corresponding to each render pass between the begin render identifier and the end render identifier, and writes the intermediate result obtained from each render pass between the begin render identifier and the end render identifier respectively into the cache block to obtain the final image rendering result in the cache block. This ensures that the intermediate data is written into the cache block and not into the system internal memory.

For example, a begin render identifier BeginRenderPass and an end render identifier EndRenderPass may be defined respectively through the marking function configured in the target shader to begin and end one or more render passes to complete an operation of rendering a certain quantity of objects to a texture once. For example, the begin render identifier and end render identifier marked may be represented by the following code:

BeginRenderPass 1//represents the begin render identifier of a first render pass that is marked;
Draw(sun)//represents the drawing command for the sun as a graphic object in the first render pass;
Draw(house)//represents the drawing command for the house as a graphic object in the first render pass;
Draw(grass)//represents the drawing command for the grass as a graphic object in the first render pass;
EndRenderPass//represents the end render identifier of the first render pass that is marked;
BeginRenderPass 2//represents the begin render identifier of a second render pass that is marked;
Draw( . . . )//represents the drawing command for each graphic object in the second render pass; and
EndRenderPass//represents the end render identifier of the second render pass that is marked.

The above code indicates that after each run to the end render identifier EndRenderPass, all rendering instructions are submitted to the GPU for execution until the final rendering result is outputted into the texture to which the render target points.

Further, if a specific condition is met, that is, if the two render passes RenderPass are render passes corresponding to the render target and having a dependency relationship with each other, the two render passes may be merged into one render pass RenderPass. For example, both the two render passes RenderPass1 and RenderPass2 above may be set to a sub-render pass Subpass1 and a sub-render pass Subpass2 of the same render pass. For example, the begin render identifier and end render identifier marked may be represented by the following code:

BeginRenderPass 1//represents the begin render identifier of a first render pass that is marked;
Draw(sun)//represents the drawing command for the sun as a graphic object in the first render pass;
Draw(house)//represents the drawing command for the house as a graphic object in the first render pass;
Draw(grass)//represents the drawing command for the grass as a graphic object in the first render pass;
NextSubpass( )//represents the drawing command for a next sub-render pass in the first render pass;
Draw( . . . )//represents the drawing command for each graphic object in the next sub-render pass in the first render pass; and
EndRenderPass//represents the end render identifier of the first render pass that is marked.

As a result, the result outputted from Subpass 1 remains in the cache block, rather than being directly outputted to the system internal memory, which is to the corresponding texture. As a result, Subpass 2 may read the intermediate result data of Subpass 1 directly from the corresponding cache block, thereby effectively saving bandwidth.

In an embodiment, the performing image rendering on the scene data in the cache block in the same render pass to obtain an image rendering result in the cache block includes: performing, through the target shader, image rendering on the merged render pass according to scene data in a current cache block, to obtain an intermediate result corresponding to the render passes having the dependency relationship; storing the intermediate result to a corresponding position in the cache block; and when the operation of performing image rendering on the merged render pass according to scene data in a current cache block is completed, using a next cache block as the current cache block, and repeating the operation of performing, through the target shader, image rendering on the merged render pass according to scene data in a current cache block, to obtain an intermediate result corresponding to the render passes having the dependency relationship.

Scene data corresponding to one or more pixels is stored in each cache block.

In the process of performing image rendering on the merged render pass, the GPU of the terminal may first perform image rendering on the merged render pass according to the scene data in the current cache block through the target shader to obtain the intermediate result corresponding to the render pass having a dependency relationship, and store the intermediate result obtained from each render pass in the corresponding position in the cache block.

The GPU then uses a next cache block as the current cache block, and repeats the step of performing image rendering on the merged render pass according to the scene data in the current cache block. That is, the GPU switches to the next cache block after all merged render passes are executed on each cache block, and repeats this process for the next cache block. This can effectively improve the efficiency of image rendering on each pixel.

In an embodiment, the storing the intermediate result to a corresponding position in the cache block includes: writing the intermediate result corresponding to each pixel into a corresponding cache block, a byte usage of the intermediate result corresponding to each pixel being no more than a memory capacity of each cache block.

The scene data and the intermediate result corresponding to each pixel are respectively stored in a corresponding cache block.

Specifically, after processing the merged render pass through the target shader, the GPU of the terminal acquires the intermediate result obtained from each render pass, and writes the intermediate result corresponding to each pixel into a corresponding cache block. Therefore, each pixel is in a one-to-one correspondence with pixel data stored in the cache block, that is, each pixel, when performing a rendering calculation through the target shader, only needs to read its corresponding pixel data from the corresponding position of the current corresponding cache block.

The byte usage of the intermediate result corresponding to each pixel is no more than the memory capacity of each cache block, so as to ensure that the stored data volume is no more than the size of each cache block. If the byte usage corresponding to each pixel exceeds the memory capacity of each cache block, the GPU is forced to reduce the memory consumption of the data to be stored in each cache block, resulting in a certain performance degradation. For example, the memory capacity of each cache block may be specifically 16 bytes, then the byte usage of the intermediate result corresponding to each pixel may be 16 byte information stored for each pixel. By setting the byte usage of the intermediate result corresponding to each pixel, the data processing performance and efficiency during image rendering can be effectively ensured.

In an embodiment, the render pass includes a texture sampling pass and a lighting shading pass; and the performing image rendering on the scene data in the cache block in the same render pass to obtain an image rendering result in the cache block includes: performing, through the target shader, image rendering on the texture render pass according to the scene data in the cache block to obtain texture result data of the texture render pass, and writing the texture result data of the texture render pass into the cache block; and performing, through the target shader, image rendering on the lighting shading pass according to the texture result data in the cache block to obtain shading result data of the lighting shading pass, and writing the shading result data of the lighting shading pass into the cache block.

The render pass includes a texture sampling pass and a lighting shading pass. For example, the texture sampling pass may be GBuffer Pass, and the lighting shading pass may be Lighting Pass. The GBuffer Pass, in deferring rendering pipelines, is a step of outputting attributes of all visible objects into multiple textures for later lighting calculation. For example, the texture sampling pass may use multiple render targets to generate corresponding geometric buffers, that is, to respectively render colors, normal lines, material categories, world spatial coordinates, and the like into corresponding texture arrays in a single drawing.

During image rendering on the merged render pass, the GPU of the terminal first processes the texture render pass and writes the texture result data of the texture render pass into the cache block according to the scene data in the cache block through the target shader. Consequently, the GPU directly extracts the intermediate result of the previous calculation from the cache block for corresponding computational processing in each operation.

Then, the GPU processes the lighting shading pass and writes the shading result data of the lighting shading pass into the cache block according to the texture result data in the cache block through the target shader. After the processing of multiple merged render passes is completed, the final image rendering result corresponding to the image frame to be rendered can be obtained and still be written into the cache block. The image rendering result in the cache block is then written into the system internal memory to display the rendered image frame on the screen of the terminal. This avoids a large amount of data read and write consumption caused by writing the intermediate result data obtained from each render pass into the system internal memory, thereby effectively reducing the bandwidth consumption during image rendering, and then effectively improving the efficiency of image rendering.

Figure 6:
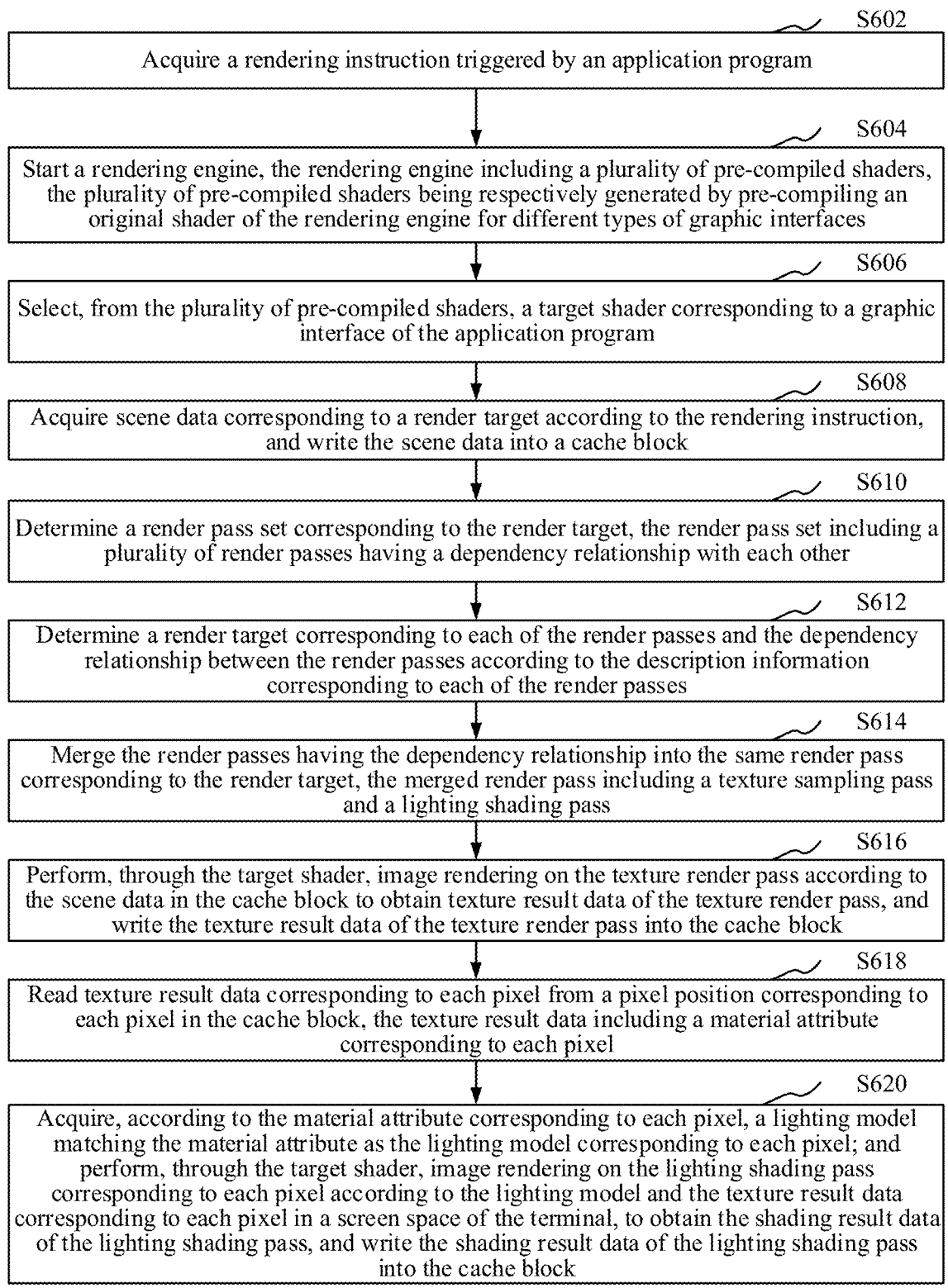
FIG. 6 is a schematic flowchart of an image rendering method according to another embodiment.

In an embodiment, as shown in FIG. 6, another image rendering method is provided, including the following steps:

S602. Acquire a rendering instruction triggered by an application program.

S604. Start a rendering engine, the rendering engine including a plurality of pre-compiled shaders, the plurality of pre-compiled shaders being respectively generated by pre-compiling an generic shader of the rendering engine for different types of graphic interfaces.

S606. Select, from the plurality of pre-compiled shaders, a target shader corresponding to a graphic interface of the application program.

S608. Acquire scene data corresponding to a render target according to the rendering instruction, and write the scene data into a cache block.

S610. Determine a render pass set corresponding to the render target, the render pass set including a plurality of render passes having a dependency relationship with each other.

S612. Determine a render target corresponding to each of the render passes and the dependency relationship between the render passes according to the description information corresponding to each of the render passes.

S614. Merge the render passes having the dependency relationship into the same render pass corresponding to the render target, the merged render pass including a texture sampling pass and a lighting shading pass.

S616. Perform, through the target shader, image rendering on the texture render pass according to the scene data in the cache block to obtain texture result data of the texture render pass, and write the texture result data of the texture render pass into the cache block.

S618. Read texture result data corresponding to each pixel from a pixel position corresponding to each pixel in the cache block, the texture result data including a material attribute corresponding to each pixel.

S620. Acquire, according to the material attribute corresponding to each pixel, a lighting model matching the material attribute as the lighting model corresponding to each pixel; and perform, through the target shader, image rendering on the lighting shading pass corresponding to each pixel according to the lighting model and the texture result data corresponding to each pixel in a screen space of the terminal, to obtain the shading result data of the lighting shading pass, and write the shading result data of the lighting shading pass into the cache block.

The texture result data includes a material attribute corresponding to each pixel, and lighting shading may be performed on different material attributes respectively through the corresponding lighting model.

The GPU of the terminal processes the texture render pass and writes the texture result data of the texture render pass into the cache block according to the scene data in the cache block through the target shader.

Specifically, when processing the lighting shading pass through the target shader, the GPU reads the texture result data corresponding to each pixel from the pixel position corresponding to each pixel in the cache block. Then, a proper lighting model is selected for calculation based on the material attribute corresponding to the current pixel. The GPU then processes the lighting shading pass corresponding to each pixel according to the lighting model and the texture result data corresponding to each pixel in the screen space through the target shader.

Since the entire scene has been rendered onto the texture, the lighting shading pass for lighting calculation only needs to read the corresponding texture result data directly from these texture results, that is, from the corresponding cache block. In this process, the calculation is performed in the screen space. In this way, the required complexity of lighting calculation in three-dimensional space is reduced to two-dimensional screen space, thereby greatly saving the amount of computation.

In a specific application scenario, the image rendering method is applied to a game application program. The game application program includes a rendering engine, and the rendering engine may be a rendering engine obtained by recompiling based on the Unreal Engine. The Unreal Engine includes an generic shader. Shaders corresponding to different types of graphic interfaces are generated by recompiling the Unreal Engine.

A user may start the game application program through the corresponding terminal, run the rendering engine after the game application program starts, and transmit a rendering instruction to a known GPU.

After acquiring the rendering instruction triggered by the game application program, the GPU of the terminal calls a target shader corresponding to a graphic interface of the application program from the pre-compiled shaders for different types of graphic interfaces in the rendering engine. The GPU of the terminal then acquires scene data of a render target according to the rendering instruction, and writes the scene data into a cache block. Then, through the called target shader, the render passes corresponding to the render target and having a dependency relationship with each other are merged into the same render pass for image rendering according to the scene data in the cache block, the finally obtained image rendering result is written into the cache block, and finally the image rendering result obtained in the cache block is written into a system internal memory.

Specifically, the GPU performs image rendering on the merged render pass by deferring rendering pipelines. The merged render pass may include a texture sampling pass and a lighting shading pass.

In this embodiment, image rendering is first performed on the texture sampling pass. Then, based on obtained texture result data, image rendering is performed on the lighting shading pass by using deferred pipelines, which can render multiple light sources of different colors more efficiently, thereby effectively improving the rendering efficiency of multi-source scenes.

Figure 7:
FIG. 7 is a schematic diagram of an image rendering effect of an image frame according to an embodiment.

FIG. 7 is a schematic diagram of an image rendering effect of an image frame. Multiple light sources of different colors may be effectively displayed through deferred pipelines, which can support a large number of light sources, and make the rendered image more realistic, effectively improving the rendering efficiency of multi-source scenes.

In another specific application scenario, the image rendering method may also be applied to an application program with an image editing function, such as various image editing software, photo retouching software, and video software with an image editing function. The application program with an image editing function includes a rendering engine. The rendering engine includes pre-compiled shaders for different types of graphic interfaces.

After a user starts an application program with an image editing function through a corresponding terminal, an image may be edited to various effects through the application program. For example, an image to be rendered may be an original image or a continuous image frame, or may be an image captured by a camera apparatus. A user may add a variety of filter effects to the original image or continuous image frame through the application program with an image editing function to achieve a variety of filter effects. The application program may transmit a rendering instruction to a GPU of the terminal while editing the image to be rendered.

After acquiring the rendering instruction triggered by the application program, the GPU calls a target shader corresponding to a graphic interface of the application program from pre-compiled shaders for different types of graphic interfaces in the rendering engine. Therefore, when the application program is running, the target shader corresponding to the graphic interface can be flexibly called according to a type of a current running platform of the application program, so as to be able to adapt to various running platforms. The GPU then acquires scene data of a render target according to the rendering instruction, and writes the scene data into a cache block. The scene data includes scene data corresponding to the image to be rendered, and also includes filter scene data corresponding to a filter effect selected by a user.

The GPU then merges, through the called target shader, the render passes corresponding to the render target and having a dependency relationship with each other, according to the scene data in the cache block. The GPU performs image rendering on the merged render pass by deferring rendering pipelines. The merged render pass may include a texture sampling pass and a lighting shading pass. Image rendering is first performed on the texture sampling pass. Then, based on obtained texture result data, image rendering is performed on the lighting shading pass. Therefore, the rendering efficiency of multi-source scenes can be effectively improved, so as to obtain a good rendering effect.

The GPU writes a finally obtained image rendering result into the cache block, and finally writes an image rendering result obtained in the cache block into a system internal memory, to display the rendered image on the screen of the terminal based on the image rendering result in the system internal memory. In this way, not only the bandwidth consumption during image rendering can be effectively reduced, but also the efficiency of image rendering can be effectively improved.

It is to be understood that although each step of the flowcharts in FIG. 2 and FIG. 6 is shown sequentially according to arrows, the steps are not necessarily performed according to an order indicated by arrows. Unless otherwise clearly specified in this specification, the steps are performed without any strict sequence limit, and may be performed in other sequences. Moreover, at least some of the steps in FIG. 2 and FIG. 6 may include a plurality of sub-steps or a plurality of stages. These sub-steps or stages are not necessarily performed at the same moment, but may be performed at different moments. These sub-steps or stages are not necessarily performed sequentially, but may be performed in turn or alternately with at least one part of other steps or sub-steps or stages of the other steps.

Figure 8:
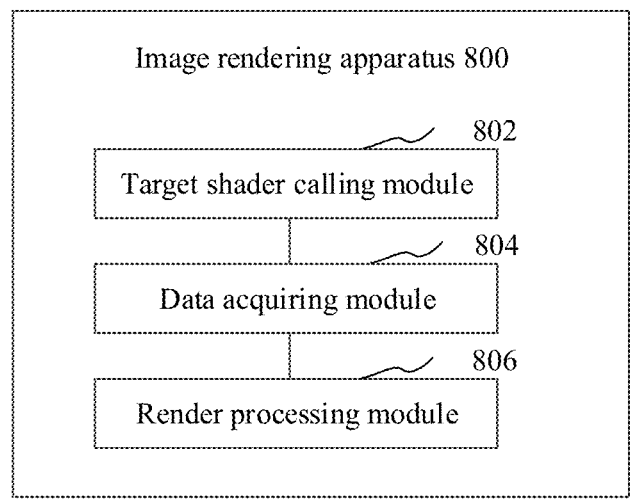
FIG. 8 is a structural block diagram of an image rendering apparatus according to an embodiment.

In an embodiment, as shown in FIG. 8, provided is an image rendering apparatus 800 applied to a terminal. The apparatus may be a software module or a hardware module, or a combination thereof to form a part of a computer device. The apparatus specifically includes: a target shader calling module 802, a data acquiring module 804, a rendering processing module 806, and a data writing module 808.

The target shader calling module 802 is configured to acquire a rendering instruction triggered by an application program; start a rendering engine, the rendering engine including a plurality of pre-compiled shaders, the plurality of pre-compiled shaders being respectively generated by pre-compiling an generic shader of the rendering engine for different types of graphic interfaces; and select, from the plurality of pre-compiled shaders, a target shader corresponding to a graphic interface of the application program.

The data acquiring module 804 is configured to acquire scene data corresponding to a render target according to the rendering instruction, and write the scene data into a cache block.

The render processing module 806 is configured to determine a render pass set corresponding to the render target, the render pass set including a plurality of render passes having a dependency relationship with each other; merge, in the cache block, the plurality of render passes having the dependency relationship into a same render pass based on the target shader; and perform image rendering on the scene data in the cache block in the same render pass.

Figure 9:
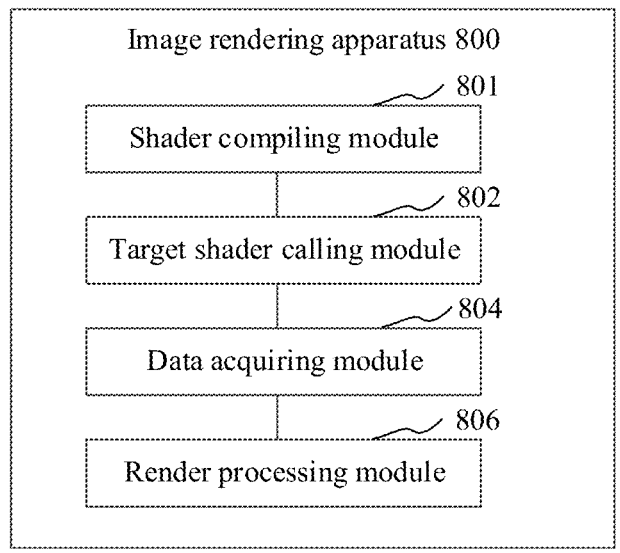
FIG. 9 is a structural block diagram of an image rendering apparatus according to another embodiment.

In an embodiment, as shown in FIG. 9, the image rendering apparatus further includes a shader compiling module 801, configured to configure, in the generic shader of the rendering engine, an explicit description function and a marking function respectively corresponding to each type of graphic interface for compiling to obtain a shader corresponding to each graphic interface. The explicit description function is used for adding description information of each of the render passes; and the marking function is used for marking a begin render identifier and an end render identifier of the merged render pass.

In an embodiment, the shader compiling module 801 is further configured to configure, in the generic shader of the rendering engine, explicit description functions and marking functions corresponding to different types of graphics processing units (GPUs) respectively for each type of graphic interface for compiling to obtain the shader corresponding to each type of graphic interface.

In an embodiment, a render hardware interface (RHI) layer of the rendering engine includes different types of graphic interfaces; and the target shader calling module 802 is further configured to determine, according to a running platform type of the application program, from the different types of graphic interfaces, a type of graphic interface corresponding to the running platform type in the application program.

In an embodiment, the target shader includes explicit description functions and marking functions corresponding to different types of GPUs; and the target shader calling module 802 is further configured to call, through a GPU, an explicit description function and a marking function corresponding to a type of the GPU from the target shader; and merge, through the target shader, the plurality of render passes having the dependency relationship into the same render pass in the cache block according to the called explicit description function and marking function.

In an embodiment, the render processing module 806 is further configured to acquire, through the target shader, description information corresponding to each of the render passes according to the explicit description function; determine a render target corresponding to each of the render passes and the dependency relationship between the render passes according to the description information corresponding to each of the render passes; and merge, in the cache block, the render passes having the dependency relationship into the same render pass corresponding to the render target according to the marking function.

In an embodiment, the scene data includes scene data corresponding to a plurality of pixels respectively; scene data corresponding to each pixel is stored in a cache block; and the render processing module 806 is further configured to call a thread corresponding to each pixel and execute each called thread in parallel, to perform image rendering on the merged render pass through the target shader and the scene data corresponding to each pixel.

In an embodiment, the render processing module 806 is further configured to mark, for the render passes having the dependency relationship, a begin render identifier and an end render identifier corresponding to each of the render passes; and perform, through the target shader, image rendering on the merged render pass according to the scene data in the cache block, to obtain an intermediate result corresponding to each of the render passes between the begin render identifier and the end render identifier, and write the intermediate result corresponding to each of the render passes between the begin render identifier and the end render identifier into the cache block to obtain the final image rendering result in the cache block.

In an embodiment, the render processing module 806 is further configured to perform, through the target shader, image rendering on the merged render pass according to scene data in a current cache block, to obtain an intermediate result corresponding to the render passes having the dependency relationship, and store the intermediate result to a corresponding position in the cache block; and when the operation of performing image rendering on the merged render pass according to scene data in a current cache block is completed, use a next cache block as the current cache block, and repeat the operation of performing, through the target shader, image rendering on the merged render pass according to scene data in a current cache block, to obtain an intermediate result corresponding to the render passes having the dependency relationship.

In an embodiment, the render processing module 806 is further configured to write the intermediate result corresponding to each pixel into a corresponding cache block, a byte usage of the intermediate result corresponding to each pixel being no more than a memory capacity of each cache block.

In an embodiment, the render pass includes a texture sampling pass and a lighting shading pass; and the render processing module 806 is further configured to perform, through the target shader, image rendering on the texture render pass according to the scene data in the cache block to obtain texture result data of the texture render pass; write the texture result data of the texture render pass into the cache block; and perform, through the target shader, image rendering on the lighting shading pass according to the texture result data in the cache block to obtain shading result data of the lighting shading pass, and write the shading result data of the lighting shading pass into the cache block.

In an embodiment, the render processing module 806 is further configured to read texture result data corresponding to each pixel from a pixel position corresponding to each pixel in the cache block, the texture result data including a material attribute corresponding to each pixel; acquire, according to the material attribute corresponding to each pixel, a lighting model matching the material attribute as the lighting model corresponding to each pixel; and perform, through the target shader, image rendering on the lighting shading pass corresponding to each pixel according to the lighting model and the texture result data corresponding to each pixel in a screen space of the terminal, to obtain the shading result data of the lighting shading pass.

For a specific limitation on the image rendering apparatus, refer to the limitation on the image rendering method above, and details are not described herein again. The modules in the foregoing image rendering apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a terminal, and an internal structure diagram thereof may be shown in FIG. 10. The computer device includes a processor, a memory, a communication interface, a display screen, and an input apparatus that are connected by a system bus. The processor of the computer device is configured to provide computing and control capabilities. The memory of the computer device includes a non-volatile storage medium and an internal memory. The non-volatile storage medium stores an operating system and a computer-readable instruction. The internal memory provides an environment for running of the operating system and the computer-readable instruction in the non-volatile storage medium. The communication interface of the computer device is configured to communicate with an external terminal in a wired or wireless manner. The wireless communication may be implemented by using Wi-Fi, operator network, NFC, or other technologies. The computer-readable instruction is executed by a processor to implement an image rendering method. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 10:
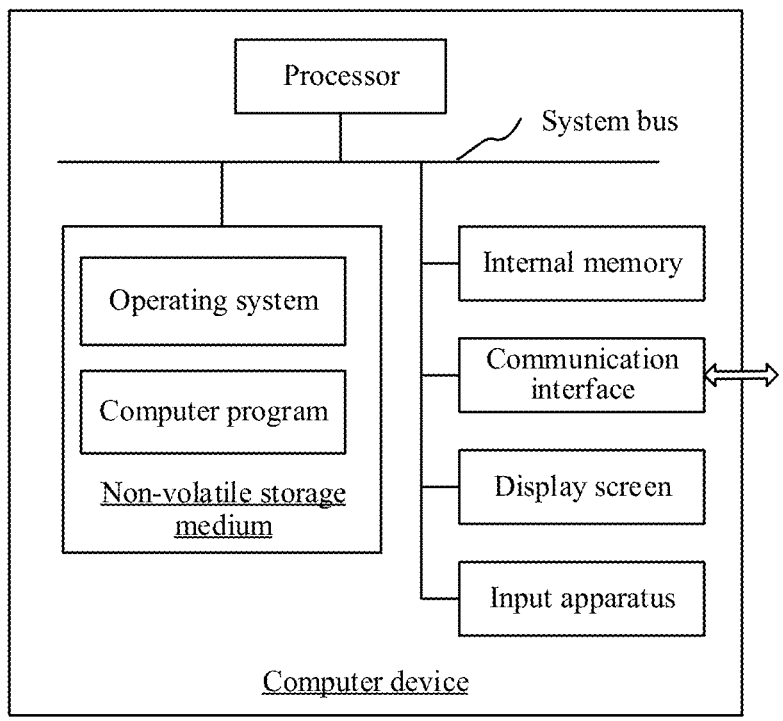
FIG. 10 is a diagram of an internal structure of a computer device according to an embodiment.

A person skilled in the art may understand that, the structure shown in FIG. 10 is only a block diagram of a part of a structure related to a solution of this application and does not limit the computer device to which the solution of this application is applied. Specifically, the computer device may include more or fewer components than those in the drawings, or some components are combined, or a different component deployment is used.

In an embodiment, a computer device is further provided, including a memory and a processor. The memory stores a computer-readable instruction. The processor, when executing the computer-readable instruction, implements the steps in the foregoing method embodiments.

In an embodiment, one or more computer-readable storage media are provided, storing a computer-readable instruction. The computer-readable instruction, when executed by a processor, implements the steps in the foregoing method embodiments.

In an embodiment, a computer program product is provided, the computer program product includes a computer-readable instruction, and the computer-readable instruction is stored in the computer-readable storage medium. The processor of the computer device reads the computer-readable instruction from the computer-readable storage medium, and the processor executes the computer-readable instruction, to cause the computer device to perform the steps in the method embodiments.

A person of ordinary skill in the art may understand that all or some of the procedures of the methods of the above embodiments may be implemented by computer-readable instructions instructing relevant hardware. The computer-readable instruction may be stored in a non-volatile computer-readable storage medium. When the computer-readable instruction is executed, the computer-readable instruction may include the procedures of the embodiments of the above methods. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The technical features in the foregoing embodiments may be randomly combined. For concise description, not all possible combinations of the technical features in the foregoing embodiment are described. However, provided that combinations of the technical features do not conflict with each other, the combinations of the technical features are considered as falling within the scope recorded in this specification.

The foregoing embodiments only describe several implementations of this application, which are described specifically and in detail, but cannot be construed as a limitation to the patent scope of the present disclosure. A person of ordinary skill in the art may further make several variations and improvements without departing from the ideas of this application, and such variations and improvements all fall within the protection scope of this application. Therefore, the protection scope of this application is subject to the appended claims. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. An image rendering method performed by a graphics processing unit (GPU) of a computer device, the method comprising:
    acquiring a rendering instruction triggered by an application program;
    starting a rendering engine, the rendering engine comprising a plurality of pre-compiled shaders, each pre-compiled shader generated by pre-compiling an original shader of the rendering engine for a respective type of graphic interface;
    selecting, from the plurality of pre-compiled shaders associated with the rendering engine, a target shader associated with the GPU and corresponding to a type of graphic interface of the application program;
    acquiring scene data corresponding to a render target according to the rendering instruction triggered by the application program, and writing the scene data into a cache block of the GPU;
    determining a plurality of render passes corresponding to the render target;
    merging, in the cache block of the GPU, the plurality of render passes into a merged render pass based on the target shader; and
    performing image rendering on the scene data in the cache block of the GPU in the merged render pass to obtain an image rendering result in the cache block of the GPU.

2. The method according to claim 1, further comprising:
    configuring, in generic shaders of the rendering engine, an explicit description function and a marking function respectively corresponding to each type of graphic interface for compiling to obtain a shader corresponding to the type of graphic interface, wherein
    the explicit description function is used for adding description information of each of the render passes;

and the marking function is used for marking a begin render identifier and an end render identifier of the merged render pass.

3. The method according to claim 2, wherein the configuring, in the generic shader of the rendering engine, an explicit description function and a marking function respectively corresponding to each type of graphic interface for compiling to obtain a shader corresponding to each graphic interface comprises:
configuring, in the generic shader of the rendering engine, explicit description functions and marking functions corresponding to different types of graphics processing units (GPUs) respectively for each type of graphic interface for compiling to obtain the shader corresponding to each type of graphic interface.

4. The method according to claim 1, wherein a render hardware interface (RHI) layer of the rendering engine comprises different types of graphic interfaces; and the method further comprises:
determining, according to a running platform type of the application program, from the different types of graphic interfaces, a type of graphic interface corresponding to the running platform type in the application program.

5. The method according to claim 1, wherein the target shader comprises explicit description functions and marking functions corresponding to different types of GPUs; and the merging, in the cache block, the plurality of render passes into a merged render pass based on the target shader comprises:
calling, through the GPU, an explicit description function and a marking function corresponding to the GPU from the target shader; and
merging, through the target shader, the plurality of render passes into the merged render pass in the cache block of the GPU according to the explicit description function and the marking function.

6. The method according to claim 5, wherein the merging, through the target shader, the plurality of render passes into the merged render pass in the cache block according to the explicit description function and the marking function comprises:
acquiring, through the target shader, description information corresponding to each of the plurality of render passes according to the explicit description function;
determining a render target corresponding to each of the plurality of render passes and a dependency relationship between the render passes according to the description information corresponding to each of the plurality of render passes; and
merging, in the cache block, the plurality of render passes having the dependency relationship into the merged render pass corresponding to the render target according to the marking function.

7. The method according to claim 1, wherein scene data corresponding to each pixel of a plurality of pixels is stored in the cache block; and the performing image rendering on the scene data in the cache block in the merged render pass to obtain an image rendering result in the cache block comprises:
calling a thread corresponding to each pixel of the plurality of pixels and executing each called thread in parallel, to perform image rendering on the merged render pass through the target shader and the scene data corresponding to each pixel of the plurality of pixels.

8. The method according to claim 1, wherein the plurality of render passes comprise a texture sampling pass and a lighting shading pass; and the performing image rendering on the scene data in the cache block in the merged render pass comprises:
performing, through the target shader, image rendering on the texture render pass according to the scene data in the cache block to obtain texture result data of the texture render pass, and writing the texture result data of the texture render pass into the cache block; and
performing, through the target shader, image rendering on the lighting shading pass according to the texture result data in the cache block to obtain shading result data of the lighting shading pass, and writing the shading result data of the lighting shading pass into the cache block.

9. A computer device, comprising a memory and a graphics processing unit (GPU), the memory storing a computer-readable instruction that, when executed by the GPU, causes the computer device to perform an image rendering method, the method comprising:
acquiring a rendering instruction triggered by an application program;
starting a rendering engine, the rendering engine comprising a plurality of pre-compiled shaders, each pre-compiled shader generated by pre-compiling an original shader of the rendering engine for a respective type of graphic interface;
selecting, from the plurality of pre-compiled shaders associated with the rendering engine, a target shader associated with the GPU and corresponding to a type of graphic interface of the application program;
acquiring scene data corresponding to a render target according to the rendering instruction triggered by the application program, and writing the scene data into a cache block of the GPU;
determining a plurality of render passes corresponding to the render target;
merging, in the cache block of the GPU, the plurality of render passes into a merged render pass based on the target shader; and
performing image rendering on the scene data in the cache block of the GPU in the merged render pass to obtain an image rendering result in the cache block of the GPU.

10. The computer device according to claim 9, wherein the method further comprises:
configuring, in generic shaders of the rendering engine, an explicit description function and a marking function respectively corresponding to each type of graphic interface for compiling to obtain a shader corresponding to the type of graphic interface, wherein
the explicit description function is used for adding description information of each of the render passes; and the marking function is used for marking a begin render identifier and an end render identifier of the merged render pass.

11. The computer device according to claim 10, wherein the configuring, in the generic shader of the rendering engine, an explicit description function and a marking function respectively corresponding to each type of graphic interface for compiling to obtain a shader corresponding to each graphic interface comprises:
configuring, in the generic shader of the rendering engine, explicit description functions and marking functions corresponding to different types of graphics processing units (GPUs) respectively for each type of graphic interface for compiling to obtain the shader corresponding to each type of graphic interface.

12. The computer device according to claim 9, wherein a render hardware interface (RHI) layer of the rendering engine comprises different types of graphic interfaces; and the method further comprises:

determining, according to a running platform type of the application program, from the different types of graphic interfaces, a type of graphic interface corresponding to the running platform type in the application program.

13. The computer device according to claim 9, wherein the target shader comprises explicit description functions and marking functions corresponding to different types of GPUs; and the merging, in the cache block, the plurality of render passes into a merged render pass based on the target shader comprises:

calling, through the GPU, an explicit description function and a marking function corresponding to the GPU from the target shader; and merging, through the target shader, the plurality of render passes into the merged render pass in the cache block of the GPU according to the explicit description function and the marking function.

14. The computer device according to claim 13, wherein the merging, through the target shader, the plurality of render passes into the merged render pass in the cache block according to the explicit description function and the marking function comprises:

acquiring, through the target shader, description information corresponding to each of the plurality of render passes according to the explicit description function;

determining a render target corresponding to each of the plurality of render passes and a dependency relationship between the render passes according to the description information corresponding to each of the plurality of render passes; and merging, in the cache block, the plurality of render passes having the dependency relationship into the merged render pass corresponding to the render target according to the marking function.

15. The computer device according to claim 9, wherein scene data corresponding to each pixel of a plurality of pixels is stored in the cache block; and the performing image rendering on the scene data in the cache block in the merged render pass to obtain an image rendering result in the cache block comprises:

calling a thread corresponding to each pixel of the plurality of pixels and executing each called thread in parallel, to perform image rendering on the merged render pass through the target shader and the scene data corresponding to each pixel of the plurality of pixels.

16. The computer device according to claim 9, wherein the plurality of render passes comprise a texture sampling pass and a lighting shading pass; and the performing image rendering on the scene data in the cache block in the merged render pass comprises:

performing, through the target shader, image rendering on the texture render pass according to the scene data in the cache block to obtain texture result data of the texture render pass, and writing the texture result data of the texture render pass into the cache block; and performing, through the target shader, image rendering on the lighting shading pass according to the texture result data in the cache block to obtain shading result data of the lighting shading pass, and writing the shading result data of the lighting shading pass into the cache block.

17. One or more non-transitory computer-readable storage media, storing a computer-readable instruction, the computer-readable instruction, when executed by a graphics processing unit (GPU) of a computer device, causing the computer device to perform an image rendering method, the method comprising:

acquiring a rendering instruction triggered by an application program;

starting a rendering engine, the rendering engine comprising a plurality of pre-compiled shaders, each pre-compiled shader generated by pre-compiling an original shader of the rendering engine for a respective type of graphic interface;

selecting, from the plurality of pre-compiled shaders associated with the rendering engine, a target shader associated with the GPU and corresponding to a type of graphic interface of the application program;

acquiring scene data corresponding to a render target according to the rendering instruction triggered by the application program, and writing the scene data into a cache block of the GPU;

determining a plurality of render passes corresponding to the render target;

merging, in the cache block of the GPU, the plurality of render passes into a merged render pass based on the target shader; and performing image rendering on the scene data in the cache block of the GPU in the merged render pass to obtain an image rendering result in the cache block of the GPU.

18. The non-transitory computer-readable storage media according to claim 17, wherein the method further comprises:

configuring, in generic shaders of the rendering engine, an explicit description function and a marking function respectively corresponding to each type of graphic interface for compiling to obtain a shader corresponding to the type of graphic interface, wherein the explicit description function is used for adding description information of each of the render passes; and the marking function is used for marking a begin render identifier and an end render identifier of the merged render pass.

19. The non-transitory computer-readable storage media according to claim 17, wherein a render hardware interface (RHI) layer of the rendering engine comprises different types of graphic interfaces; and the method further comprises:

determining, according to a running platform type of the application program, from the different types of graphic interfaces, a type of graphic interface corresponding to the running platform type in the application program.

20. The non-transitory computer-readable storage media according to claim 17, wherein the plurality of render passes comprise a texture sampling pass and a lighting shading pass; and the performing image rendering on the scene data in the cache block in the merged render pass comprises:

performing, through the target shader, image rendering on the texture render pass according to the scene data in the cache block to obtain texture result data of the texture render pass, and writing the texture result data of the texture render pass into the cache block; and performing, through the target shader, image rendering on the lighting shading pass according to the texture result data in the cache block to obtain shading result data of the lighting shading pass, and writing the shading result data of the lighting shading pass into the cache block.

* * * * *